United States Patent
Ding et al.

(10) Patent No.: US 11,174,424 B2
(45) Date of Patent: Nov. 16, 2021

(54) CORE-SHELL STRUCTURED ANIONIC NANO MICROEMULSION SYSTEM, AND PREPARATION AND APPLICATION THEREOF

(71) Applicant: PetroChina Company Limited, Beijing (CN)

(72) Inventors: Bin Ding, Beijing (CN); Xiangfei Geng, Beijing (CN); Jianhui Luo, Beijing (CN); Yang Shi, Beijing (CN); Jianyong Xie, Beijing (CN); Bo Huang, Beijing (CN); Yang Gao, Beijing (CN); Pingmei Wang, Beijing (CN); Baoliang Peng, Beijing (CN)

(73) Assignee: PetroChina Company Limited, Beijing (CN)

( * ) Notice: Subject to any disclaimer, the term of this patent is extended or adjusted under 35 U.S.C. 154(b) by 97 days.

(21) Appl. No.: 16/691,944

(22) Filed: Nov. 22, 2019

(65) Prior Publication Data
US 2020/0208040 A1 Jul. 2, 2020

(30) Foreign Application Priority Data
Jan. 2, 2019 (CN) .......................... 201910001672.7

(51) Int. Cl.
*C09K 8/584* (2006.01)

(52) U.S. Cl.
CPC .......... *C09K 8/584* (2013.01); *C09K 2208/06* (2013.01)

(58) Field of Classification Search
None
See application file for complete search history.

(56) References Cited

U.S. PATENT DOCUMENTS

| | | |
|---|---|---|
| 3,198,736 A | 8/1965 | Henderson |
| 3,775,317 A | 11/1973 | Inami et al. |

(Continued)

FOREIGN PATENT DOCUMENTS

| | | |
|---|---|---|
| CN | 101104794 A | 1/2008 |
| CN | 101185866 A | 5/2008 |

(Continued)

OTHER PUBLICATIONS

Ding Bin et al. "Characteristics and EOR mechanisms of nanofluids Permeation flooding for tight oil"; Petroleum Exploration and Development, vol. 47, No. 4; 10 pages.

(Continued)

*Primary Examiner* — John J Figueroa
(74) *Attorney, Agent, or Firm* — Meunier Carlin & Curfman LLC

(57) ABSTRACT

The invention discloses a core-shell structured anionic nano microemulsion system, and preparation and application thereof. The system comprises an anionic Gemini surfactant, an oil phase material, a solubilizer and water; wherein the microemulsion has a core-shell structure, with the outer shell being an anionic Gemini surfactant, and the inner core being an oil phase material. The anionic Gemini surfactant is N,N,N',N'-dodecyl tetrasubstituted diphenyl ether sulfonate having the structural formula:

(Continued)

The anionic nano-microemulsion system of the present invention is homogeneous and transparent, has a spherical core-shell structure, has a nanometer size (3 to 40 nm) as droplets, has a narrow particle size distribution, is not easy to agglomerate, has good stability, and has an ultra-low interfacial tension and a capability of reducing viscosity of crude oil.

19 Claims, 7 Drawing Sheets

(56) References Cited

U.S. PATENT DOCUMENTS

| | | | |
|---|---|---|---|
| 5,352,573 | A | 10/1994 | Seto et al. |
| 2004/0156994 | A1 | 8/2004 | Wiese et al. |
| 2010/0029880 | A1* | 2/2010 | Zhang .............. C09K 8/584 |
| | | | 526/287 |
| 2017/0369759 | A1 | 12/2017 | Nguyen et al. |
| 2019/0055459 | A1* | 2/2019 | Zelenev ............ C09K 8/035 |
| 2019/0153304 | A1* | 5/2019 | Zelenev ............ E21B 43/20 |
| 2020/0208045 | A1* | 7/2020 | Geng ................. C11D 1/24 |

FOREIGN PATENT DOCUMENTS

| | | |
|---|---|---|
| CN | 102380330 A | 3/2012 |
| CN | 102614805 A | 8/2012 |
| CN | 102806047 | 12/2012 |
| CN | 102993413 | 3/2013 |
| CN | 103173198 | 6/2013 |
| CN | 103864648 A | 6/2014 |
| CN | 104830301 | 8/2015 |
| CN | 105435706 A | 3/2016 |
| CN | 106590570 | 4/2017 |
| CN | 106590578 | 4/2017 |
| CN | 107304162 | 10/2017 |
| JP | H05194788 | 8/1993 |
| JP | 2003301109 A | 10/2003 |
| WO | 2010148177 A2 | 12/2010 |
| WO | 2016176385 | 11/2016 |

OTHER PUBLICATIONS

Ding Shan et al.; Characteristics and EOR mechanism of nanofluids permeation flooding for tight oil, Petroleum Exploration and Development, vol. 47, No. 4; 9 pages.
Hu Jian-Ii et al., "Synthesis and Surface Activities of Sodium Oleoyl Amido Diphenyl Ether Disulfonate", Fine Chemicals, vol. 22, No. 5.
M.E.Ginn, et al, "Performance Evaluation of selected Fabric Softeners", The Journal of the American Oil Chemists Society, vol. 42; 5 pages.
M. Ben Moshe et al; "Structure of microemulsions with gemini surfactant"; Studied by solvatochromic probe and diffusion NMR, Journal of Colloid and Interface Science,vol. 276, No. 1; 6 pages.
Cheng Yu—qiao et al.; "Synthesis and surface active properties of a bis-sodium lauryl phenyl ether sulfonate gemini surfactant"; China Surfactant Detergent & Cosmetics, vol. 41, No. 5; 5 pages.
Tiliu Jiao et al.; "Synthesis and Properties of Dioctyl Diphenyl Ether Disulfonate Gemini Surfactant", Physical Chemistry, vol. 53, No. 4; 6 pages.
J.A.Goodson et al; "The Chemotherapy of Amoebiasis Part III. Variants of Bis(Diamylamino)Dec Ane", Brit.J.Pharmacol, vol. 62, No. 3; 10 pages.
Office Action and its English Translation issued in CN Application No. 201910001672.7; dated Oct. 23, 2020; 6 pages.
Search Report and its English Translation issued in CN Application No. 201910001672.7; dated Oct. 15, 2020; 9 pages.
Long et al., Synthesis and application in emulsion polymerization of dialkylated diphenyl ether disulfonate, BAI Long et al. Textile Auxiliaries, vol. 35. No. 3, Mar. 2018, pp. 16-20.
Zhou et al. Synthesis and Characterization of a Type of Gemini Surfactant, Zhou Xuan et al. Guangzhou Chemical Industry, vol. 41, No. 4, Feb. 2013, pp. 90-92.
C.A.Bunton, L.Robinson. Catalysis of nucleophilc substitutions by micelles of dicationic detergents [J]. F. J. Org. Chem, 1971(36): 2346-2352.
Y.P.Zhu, A. Masuyama, Deinega, Preparation and properties of double-or-triple-chain surfactants with two sulfonate groups derived from N-acyldiethanolamines [J]. J. Am. Oil Chem. Soc, 1991(68): 539-543.
Zhu Y P, Masuyama A, Okahara M. Preparation and surface active properties of amphipathic compounds with two sulfate groups and two lipophilic alkyl chains [J] J Am Oil Chem Soc,1990, 67(7): 459-463.
Zhu. Y P, Masuyama A, Kirito M. Preparation and surface-active properties of new amphipathic compounds with two phosphate groups and two long-chain alkyl groups [J] J Am Oil Chem Soc, 1991, 68(4): 268-271.
Menger F M,Littau CA. Gemini surfactants: synthesis and properties[J]. J. Am Chem Soc, 1991(113): 1451-1452.
Rosen, MJ. Geminis: A new Generation of surfactants. [J] J Chem Technol, 1993(30): 23-33.
Zana R,Talmon Y. Dependence of aggregate morphology on structure of dimeric surfactants. [J] Nature, 1993(362): 228-229.
Xiaoyan, Liu. The synthesis and application of sulfonate Gemini Surfactants, Nanjing University of Science & Technology M.D. Dissertation.
Wu et al. Research on Sulfonate Gemini Surfactant Ultralow Interfacial Tension Foam Systems, Advances in Fine Petrochemicals, vol. 18, No. 4.
STN Structural retrieval.
Chinese search report. dated Nov. 15, 2018. 8 pages.
Jing Xiao Ming; "Synthesis and Properties of Sodium Alkyl Dibenzene Sulfonate Type Double Anionic Surfactant" China Excellent Master's Thesis Engineering Science and Technology Series 1, No. 12, Dec. 15, 2013; 90 pages.
Zhao Rui-xue et al., "Synthesis and Surface Activities of the thylene Glycol Diphenyl Ether Disulfonate Gemini Surfactants Contained Two Carbonyl Group"; Journal of Jilin Institute of Chemical Technology, vol. 31 ,No. 5, May 31, 2014; May 2014; 6 pages.
Xiaoyan, Liu, "The synthesis and application of sulfonate Gemini surfactants", China Excellent Master's Thesis Engineering Science and Technology Series 1, No. 1, Jan. 15, 2016; Mar. 2015, 82 pages.
Bai Long et al.; "Performance of mono- and di-dodecyl diphenyl ether disulfonate"; TEXTILE AUXILIARIES, vol. 35, No. 8,Aug. 31, 2018; Aug. 2018; 5 pages.
Office Action and Search Report issued in counterpart CN Application No. 20190001658.7; dated Dec. 25, 2020; 12 pages.

* cited by examiner

CORE-SHELL STRUCTURED ANIONIC NANO MICROEMULSION SYSTEM, AND PREPARATION AND APPLICATION THEREOF

CROSS-REFERENCE TO RELATED APPLICATION

This application claims priority to Chinese Patent Application No. 201910001672.7, filed on Jan. 2, 2019, which is hereby incorporated by reference in its entirety.

TECHNICAL FIELD

The invention belongs to the technical field of microemulsion, in particular to a core-shell structured anionic nano microemulsion system, and preparation and application thereof.

BACKGROUND

Microemulsion is prepared from surfactant, cosurfactant, water and oil according to a certain proportion, and its droplet size is in a range of 1 to 300 nm. Compared with ordinary emulsions, microemulsion is transparent or semi-transparent in appearance, has small particle size, has better fluidity, and represents a stable system with homogeneous phase, so it is not easy for coagulation or phase separation to occur after long-term storage. Due to the small size and large number of droplets, the microemulsion system has a large specific surface area and strong interfacial activity, thus it has been widely used in daily chemical industry, light industry, petroleum exploitation and other fields.

High energy methods are traditional preparation methods for microemulsions, and known to mainly use high shear rate and high power ultrasound to forcibly emulsify the water phase containing the surfactant and the cosurfactant and the oil phase. The conventional homogenizer, colloid mill, stirrer and other equipment can only obtain the micron-scale emulsion system, the large droplet in the emulsion has to be destroyed into nano-sized small droplets in a high-energy manner employing high-pressure homogenizer, and high-power ultrasound and other special equipment; the equipment is expensive, the production cost is high, and the stability of the obtained microemulsion is poor.

With the breakthrough in surfactant R&D technology, the preparation of microemulsions by low energy methods has been paid more and more attention, including dilution methods, phase transition temperature methods and emulsification methods. Among them, the surfactant is the core of the low energy method. The microemulsion particles or droplets are formed in a short time by using the strong interfacial activity of the surfactant, and a layered or double continuous layer is formed under the conditions of dilution, critical phase transition temperature, self-emulsification and the like, and the oil phase material is effectively encapsulated, to achieve a small-sized droplet state, such that the nano-sized microemulsion system is finally obtained. However, that conventional aqueous surfactant has the disadvantage of non-diversity molecular structure, poor interfacial activity, large particle size of formed microemulsion system, uncontrollable droplet morphology, poor dispersibility of the system and serious agglomeration. In addition, the low-energy reaction requires finely control of reaction conditions, has a severe requirement for reaction systems (temperature, pH, humidity, feeding sequence, stir speed, etc.), and the existing process conditions cannot meet the demands of industrial production, thus the application of microemulsion technology in the field of petroleum exploitation is severely limited. Therefore, a key problem to be resolved is to develop a low-cost nano-microemulsion system with core-shell structure, small particle size, narrow distribution, good stability and simple and feasible preparation process.

SUMMARY OF THE INVENTION

In order to solve at least one of the above technical problems, the present invention provides a core-shell structured anionic nano microemulsion system, and a preparation and application thereof. The anionic nano microemulsion system is homogeneous and transparent, has a spherical core-shell structure, has a nanometer size (5 to 300 nm) as droplets, has a narrow particle size distribution, is not easy to agglomerate, has good stability, and has an ultra-low interfacial tension and a capability of reducing viscosity of crude oil. The preparation process is simple in operation, requires little equipment, is suitable for industrial production at a low overall cost, and has a good application prospect in the petroleum industry field.

To achieve the above objects, the present invention provides technical solutions of:

In one aspect, the present invention provides a core-shell structured anionic nano microemulsion system, which comprises: an anionic Gemini surfactant, an oil phase material, a solubilizer and water;

wherein, the microemulsion has a core-shell structure, as shown in FIG. 1, with the outer shell being an anionic Gemini surfactant, and the inner core being an oil phase material;

The anionic Gemini surfactant is an anionic Gemini surfactant of N,N,N',N'-dodecyl tetrasubstituted diphenyl ether sulfonate, and has a structural formula of:

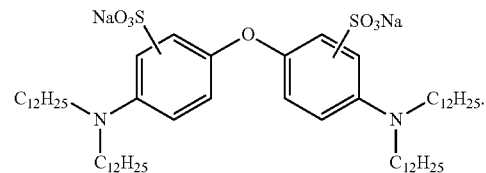

Preferably, in accordance with a particular embodiment of the present invention, the core-shell structure anionic nano microemulsion system is a homogeneous and transparent non-anionic microemulsion system, wherein the microemulsion has a spherical core-shell structure, the microemulsion has a droplet size distribution of 5 to 300 nm. The water may be a distilled water, a deionized water or an inorganic brine.

When the water is an inorganic brine, the anionic nano microemulsion system of the present invention further comprises an inorganic salt. Preferably, the inorganic salt has a mass content of 0 to 15%, excluding 0; preferably 1 to 5%. More preferably, the inorganic salt is NaCl.

Preferably, the microemulsion has an effective concentration, i.e., the total concentration of the anionic Gemini surfactant, the oil phase material and the solubilizer of 0.05 to 0.5%; preferably 0.1 to 0.3%.

Further preferably, the anionic Gemini surfactant accounts for 5 to 77% by mass, the oil phase material accounts for 5 to 46%, and the solubilizer accounts for 5 to 31%.

The oil phase material is one or a combination of more of an aromatic hydrocarbon compound, a heterocyclic compound, and a terpene compound.

Preferably, the oil phase material is one or a combination of more of xylene, pyrrolidone, menthol, alpha-pinene, beta-myrcene, limonene.

The solubilizer is one or a combination of more of small molecular alcohol compounds.

Preferably, the solubilizer is one or a combination of more of ethanol, propanol, isopropanol, ethylene glycol, butanol, and pentanol.

In the core-shell structured anionic nano microemulsion system of the present invention, the anionic Gemini surfactant of N,N,N',N'-dodecyl tetrasubstituted diphenyl ether sulfonate is a novel surfactant firstly disclosed in the present invention. The target product of such type has not been reported in the prior art literature. The invention also provides a synthesis method of the anionic Gemini surfactant, and the synthesis process consists of a one-step alkylation of amine and one-step sulfonation reaction. The reaction conditions are mild, the operation is simple, and the product is easy to separate and purify. The specific reaction principle is as follows:

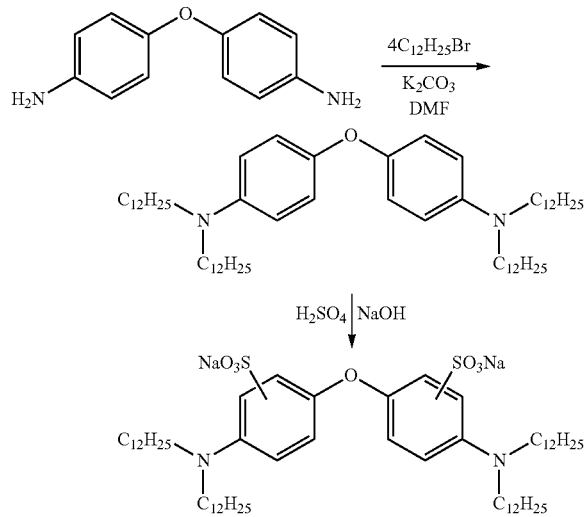

The synthesis comprises steps of:

1) subjecting 4,4'-diamino diphenyl ether to an alkylation reaction of amine with bromodecane, to obtain N,N,N',N'-dodecyl tetrasubstituted diphenyl ether;

2) subjecting N,N,N',N'-dodecyl tetrasubstituted diphenyl ether to a sulfonation reaction with concentrated sulfuric acid, to obtain the target product N,N,N',N'-dodecyl tetrasubstituted diphenyl ether sulfonate.

The following is a detailed description of each step:

1) Subjecting 4,4'-diamino diphenyl ether to an alkylation reaction of amine with bromodecane, to obtain N,N,N',N'-dodecyl tetrasubstituted diphenyl ether;

Preferably, the alkylation reaction is carried out under a protective gas atmosphere. Further preferably, the protective gas comprises nitrogen and inert gases.

Preferably, the feeding amount of bromodecane is favourably slightly excess than four equivalents of the amount of 4,4'-diamino diphenyl ether to ensure that the alkylation of the amino group is as complete as possible. In a preferable embodiment of the invention, the molar ratio of 4,4'-diamino diphenyl ether to bromodecane is 1:(4.1-4.4).

Preferably, in this alkylation reaction, N,N-dimethyl formamide (DMF) is used as solvent and $K_2CO_3$ is used as a deacid reagent to maintain the pH of the system at 7 to 10.

Preferably, the content of $K_2CO_3$ added to the system is 20 wt %.

Further preferably, the alkylation reaction is carried out at 60-70° C.; after completion of the reaction, a post-processing purification is carried out to obtain N,N,N',N'-dodecyl tetrasubstituted diphenyl ether.

In a preferred embodiment of the invention, the post-processing purification comprises: water is added for liquid separation and extraction is carried out with an organic extractant. The organic phase is concentrated to dryness, purified through column chromatography and dried, to obtain an intermediate product N,N,N',N'-dodecyl tetrasubstituted diphenyl ether.

For the organic extractant, a common organic solvent, such as ethyl acetate, dichloromethane, chloroform or the like, can be selected as an extractant. Preferably, the organic extractant is ethyl acetate. A specific extraction process comprises: extracting the aqueous phase three times with ethyl acetate, combining the organic phases, washing the combined organic phase once with water, separating the organic phase, and concentrating it to dryness.

Preferably, the developing agent for column chromatography purification is a system of petroleum ether and ethyl acetate. More preferably, the system is V (petroleum ether):V (ethyl acetate)=10:1.

2) Subjecting N,N,N',N'-dodecyl tetrasubstituted diphenyl ether to a sulfonation reaction with concentrated sulfuric acid, to obtain the target product N,N,N',N'-dodecyl tetrasubstituted diphenyl ether sulfonate.

Preferably, in the step 2), N,N,N',N'-dodecyl tetrasubstituted diphenyl ether is added to a solvent, and concentrated sulfuric acid is added dropwise thereto to carry out a reaction. After the reaction is completed, water is added to quench and the aqueous phase is separated. The intermediate product obtained by the reaction is dissolved in an aqueous phase, NaOH is added to the aqueous phase to adjust the pH to alkaline, and the aqueous phase is concentrated to dryness to obtain the target product N,N,N',N'-dodecyl tetrasubstituted diphenyl ether sulfonate.

Preferably, the solvent is acetic acid.

Further preferably, the separation of the aqueous phase further comprises extracting the aqueous phase with an extractant, separating the aqueous phase and concentrating it to dryness, and purifying it on column to obtain an intermediate product; dissolving the intermediate product in water, and then adding NaOH to adjust the pH to be alkaline.

For the organic extractant, a common organic solvent, such as ethyl acetate, dichloromethane, chloroform or the like, can be selected as an extractant. Preferably, the organic extractant is ethyl acetate. A specific extraction process comprises: extracting the aqueous phase three times with ethyl acetate, combining the organic phases, washing the combined organic phase once with water, separating the aqueous phase and concentrating it to dryness.

Preferably, when concentrated sulfuric acid is added dropwise, the reaction system needs to be subjected to an ice water bath due to the intense exothermic reaction; and after the dropwise addition is completed, the temperature is raised to room temperature to carry out a reaction.

Preferably, the pH is adjusted to 10 using NaOH.

Preferably, the NaOH is a 1 mol/L aqueous solution of NaOH.

Each of the reaction end points in the synthesis method for the above anionic Gemini surfactant is monitored using TLC.

A second aspect of the invention provides a method for the preparation of the above anionic nano microemulsion system, the method comprising:

S1, mixing an anionic Gemini surfactant, an oil phase material, a solubilizer and water well, to obtain a homogeneous mixed solution; or mixing an anionic Gemini surfactant, an oil phase material, and a solubilizer well, to obtain a homogeneous mixed solution;

S2, diluting the homogeneous mixed solution using water or inorganic brine to a low concentration condition, to obtain the core-shell structured anionic nano microemulsion system.

Preferably, the homogeneous mixed solution from S1 comprises by mass: anionic Gemini surfactant of 5 to 50%, oil phase material of 5 to 30%, solubilizer of 5 to 20%, and water of balance. There is no special requirement for the order of addition of the anionic Gemini surfactant, oil phase material and solubilizer. There is no special requirement in S2 for the order of addition of water or inorganic brine and the mixed solution from S1, and the mixture is uniformly stirred and mixed to obtain the core-shell structure anionic nano microemulsion system of the present invention.

Preferably, the low concentration condition is that the effective concentration of the microemulsion, i.e., a total concentration of the anionic Gemini surfactant, the oil phase material and the solubilizer, is 0.05 to 0.5%; preferably 0.1 to 0.3%.

Preferably, the mixing and diluting are carried out under an agitation at 10 to 400 rpm, preferably 100 to 300 rpm.

The present invention precisely construct a anionic nano microemulsion system having a core-shell structure system, by introducing an anionic Gemini surfactant of N,N,N',N'-dodecyl tetrasubstituted diphenyl ether sulfonate, which is characterized by: 1) at a low concentration (0.05 to 0.5%), the anionic microemulsion system is homogeneous and transparent, has a spherical core-shell structure with a particle size of 5 to 300 nm, and has an excellent stability; 2) The anionic microemulsion system has a simple preparation process, which greatly reduces operating costs, and has stable quality and the production can be industrialized; 3) the anionic nano microemulsion system has ultra-low interfacial tension and a capability of reducing viscosity of crude oil, can be used for the exploitation of low permeability, super/ultra low permeability, dense and shale oil and gas.

In an example of the invention, it is confirmed using TEM that the anionic nano microemulsion system has a core-shell structure.

The third aspect of the invention provides a use of the above anionic nano microemulsion system in the exploitation of low permeability, super/ultra low permeability, dense and shale oil and gas.

In an example of the invention, at 80° C., the prepared core-shell structured anionic nano microemulsion system has an interfacial tension with kerosene of 0.009 mN/m, and has an interfacial tension with a certain crude oil from Xinjiang (apparent viscosity is 18 mPa·s) of 0.08 mN/m, showing obvious superiority.

In an example of the invention, the prepared core-shell structured anionic nano microemulsion system has an average viscosity reduction efficiency of 40% for a certain crude oil from Xinjiang, and therefore has a good viscosity-reducing effect and shows obvious superiority.

Compared with prior arts, the present invention has the following advantages and effects:

1) the present invention introduce an anionic Gemini surfactant of N,N,N',N'-dodecyl tetrasubstituted diphenyl ether sulfonate to construct a core-shell structured anionic nano microemulsion system, the reaction conditions are friendly, the preparation process is simple, and it can be used for large-scale industrial production, which completely solves the technical problem that the microemulsion system prepared at low energy condition is easy to agglomerate and has poor stability.

2) The present invention obtains an anionic microemulsion system, which has a spherical core-shell structure, the particle size of the emulsion is small (5 to 300 nm), the particle size distribution is narrow, thus the emulsion is not easy to agglomerate, and has an improved stability.

3) The core-shell structured anionic nano microemulsion system obtained in the present invention has an ultra-low interfacial tension and viscosity-reducing ability for crude oil, and the internal phase oily material can be replaced, and can be used for in the exploitation of low permeability, super/ultra low permeability, dense and shale oil and gas, thus has a broad application prospect.

DETAILED DESCRIPTION OF THE INVENTION

In order to more clearly illustrate that present invention, the present invention will be further described in connection with preferred examples. It will be understood by those skilled in the art that the following detailed description is illustrative but not limiting, and should not be used to limit the scope of the invention.

Preparation of anionic Gemini surfactant of N,N,N',N'-dodecyl tetrasubstituted diphenyl ether sulfonate

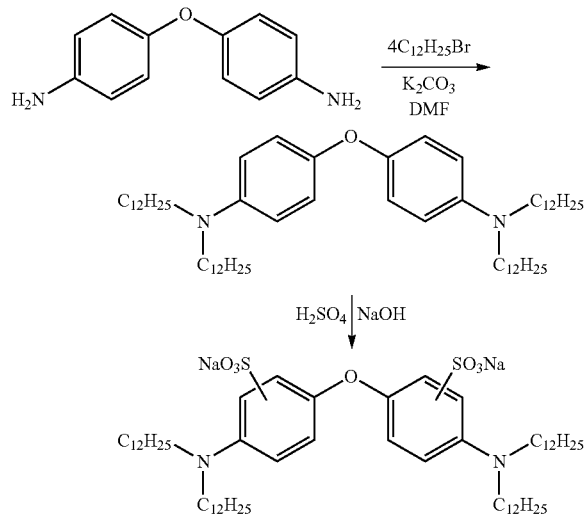

(1) Synthesis of N,N,N',N'-dodecyl tetrasubstituted diphenyl ether

Into a three-necked flask placed in a constant temperature water bath and equipped with a stirrer, 25.00 g (124.85 mmol) of 4,4'-diamino diphenyl ether, 10.46 g (41.95 mmol) of bromodecane and 5.80 g of $K_2CO_3$ (20 wt %) as deacid reagent were added sequentially. With maintaining the pH of the system=7-10, 150 mL of DMF as solvent was added under the protection of nitrogen. With stirring, the temperature was raised to 60° C., and after 24 hours of reaction, the reaction was completed (the end point of the reaction is monitored by TLC, and the developing agent is V (petroleum ether):V (ethyl acetate)=10:1). Water was added for liquid separation. The aqueous phase was extracted three times with ethyl acetate and the organic phase was washed with water. The resultant was concentrated to dryness, purified through column and dried to give 80 g (91.58 mmol) of N,N,N',N'-dodecyl tetrasubstituted diphenyl ether as a yellow oily intermediate.

(2) Synthesis of N,N,N',N'-dodecyl tetrasubstituted diphenyl ether sulfonate

With the reaction device same as that in (1), into a three-necked flask, 2.00 g (9.158 mmol) of N,N,N',N'-dodecyl tetrasubstituted diphenyl ether and 50 mL of acetic acid as solvent were added sequentially, and 10 mL of concentrated sulfuric acid was added dropwise with ice bath and stirring. After the dropwise addition was completed, the temperature was raised to room temperature, and the reaction was carried out for 6 h (the end point of the reaction is monitored by TLC). After completion of the reaction, water was added to quench, and the liquids were separated. The aqueous phase was extracted three times with ethyl acetate and the organic phase was washed with water. The resultant was concentrated to dryness and purified through column. The product was dissolved in water, and a 1 mol/L aqueous solution of NaOH was slowly added dropwise until the pH of the system was adjusted to 10, and the aqueous phase was recovered and concentrated to dryness. As a result, 1.8 g (1.75 mmol) of N,N,N',N'-dodecyl tetrasubstituted diphenyl ether sulfonate as a brown viscous product was obtained.

Figure 1:
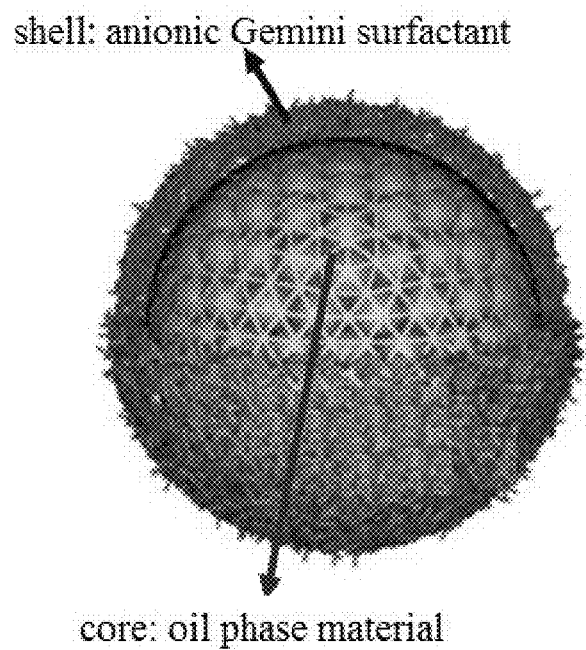
FIG. 1 is a schematic view of the structure of a microemulsion of the present invention.
Figure 2:
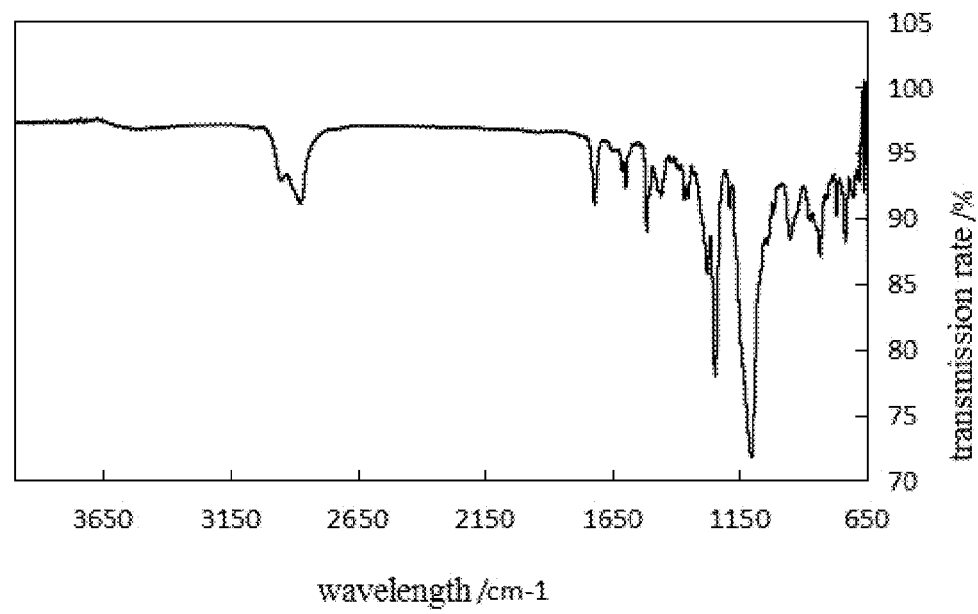
FIG. 2 is an infrared spectrum of N,N,N',N'-dodecyl tetrasubstituted diphenyl ether sulfonate.

An infrared spectrum of N,N,N',N'-dodecyl tetrasubstituted diphenyl ether sulfonate With respect to FIG. 2, it can be seen from the spectrum analysis that:
2946, 2869 are $CH_3$, $CH_2$ extensional vibration peaks; 1610, 1591, 1507, 1450 are vibrational peaks of the benzene ring skeleton; 873, 828 are characteristic peaks of para-substitution of benzene ring; 1274, 1241 are C—N extensional vibration peaks; 1100, 1049 are C—O extensional vibration peaks; 1091 is a S=O extensional vibration peak; 719 is a $(CH_2)_n$ (n≥4) plane swinging vibration peak; and 622 is a S—O extensional vibration peak.

Figure 3:
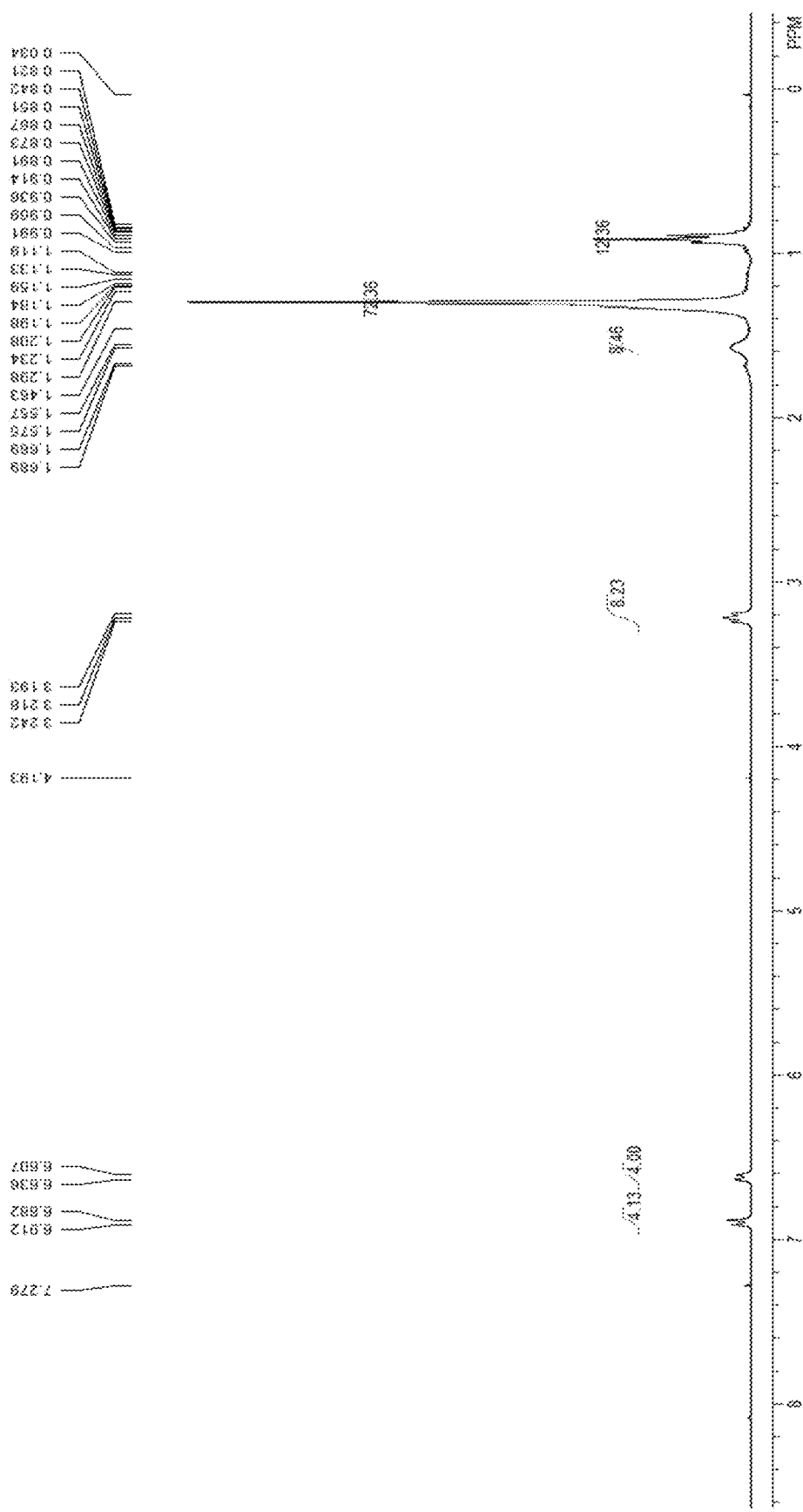
FIG. 3 is a nuclear magnetic hydrogen spectrum of N,N,N',N'-dodecyl tetrasubstituted diphenyl ether sulfonate.

A nuclear magnetic hydrogen spectrum of N,N,N',N'-dodecyl tetrasubstituted diphenyl ether sulfonate With respect to FIG. 3, it can be seen from the spectrum analysis that:
$^1$-NMR (400 MHz, $CDCl_3$): δ: 0.82-0.99 [3H, $CH_3CH_2$], 1.12-1.29 [16H, $CH_3(CH_2)_8CH_2CH_2$], 1.46-1.69 [2H, $(CH_2)_{10}CH_2CH_2N$], 3.19-3.24 [2H, $(CH_2)_{10}CH_2CH_2N$], 6.60-6.64 [1H, NCCH], 6.88-6.91 [1H, OCCH].

Figure 4:
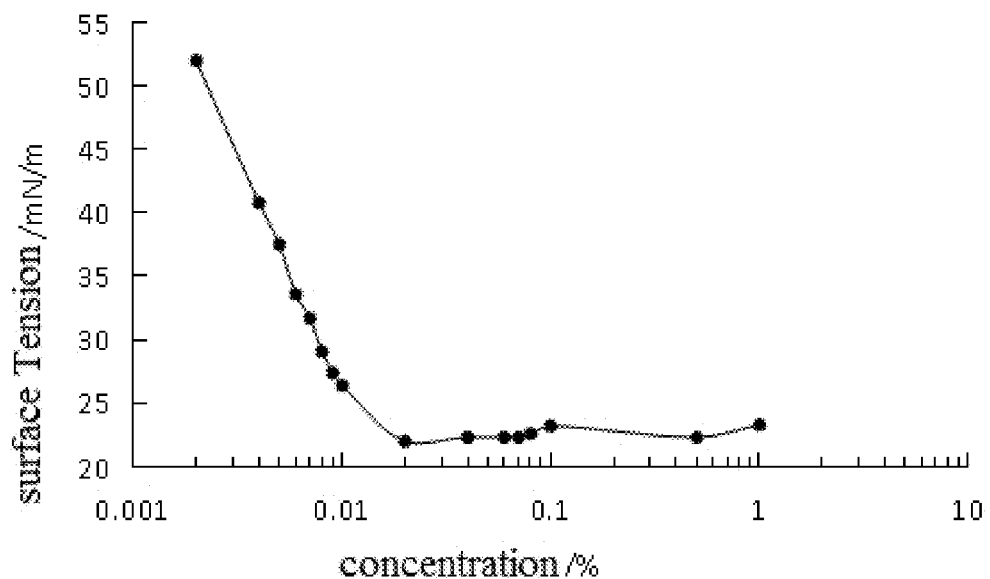
FIG. 4 is a graph of surface tension versus concentration (25° C.) of N,N,N',N'-dodecyl tetrasubstituted diphenyl ether sulfonate.

Surfactant Activity Determination of N,N,N',N'-dodecyl tetrasubstituted diphenyl ether sulfonate The ability of surfactant to reduce the surface tension of water is an important parameter to evaluate its surface activity. The surface tension of aqueous solution of target aqueous solution at different concentration at 25° C. is determined by a method of hanging plate, and a concentration dependent curve (FIG. 4) was made for the surface tension of an aqueous solution of Gemini surfactant of N,N,N',N'-dodecyl tetrasubstituted diphenyl ether sulfonate. From this curve, the surface activity parameters of the Gemini surfactant can be obtained, the critical micelle concentration cmc is 0.016 wt %, and the surface tension $\gamma_{cmc}$ at the critical micelle concentration is 23 mN/m.

EXAMPLE 1

This example provides a core-shell structured anionic nano microemulsion system and a preparation method thereof. The main preparation steps and test results are as follows:

(1) In parts by weight, 5 parts of xylene, 45 parts of anionic Gemini surfactant of N,N,N',N'-dodecyl tetrasubstituted diphenyl ether sulfonate, 15.5 parts of butanol, and 34.5 parts of water are weighed and put into reactor, and mixed under agitation at 300 rpm, until completely dissolved, and a homogeneous mixed solution is obtained.

(2) In parts by weight, 0.2 parts of the above homogeneous mixed solution and 99.8 parts of water were taken, and mixed under agitation at 300 rpm in a reactor, until completely dissolved, to obtain a core-shell structured anionic nano microemulsion system. The effective concentration thereof is 0.13%, the appearance is uniform and transparent, and it is stable for a long time.

Figure 5:
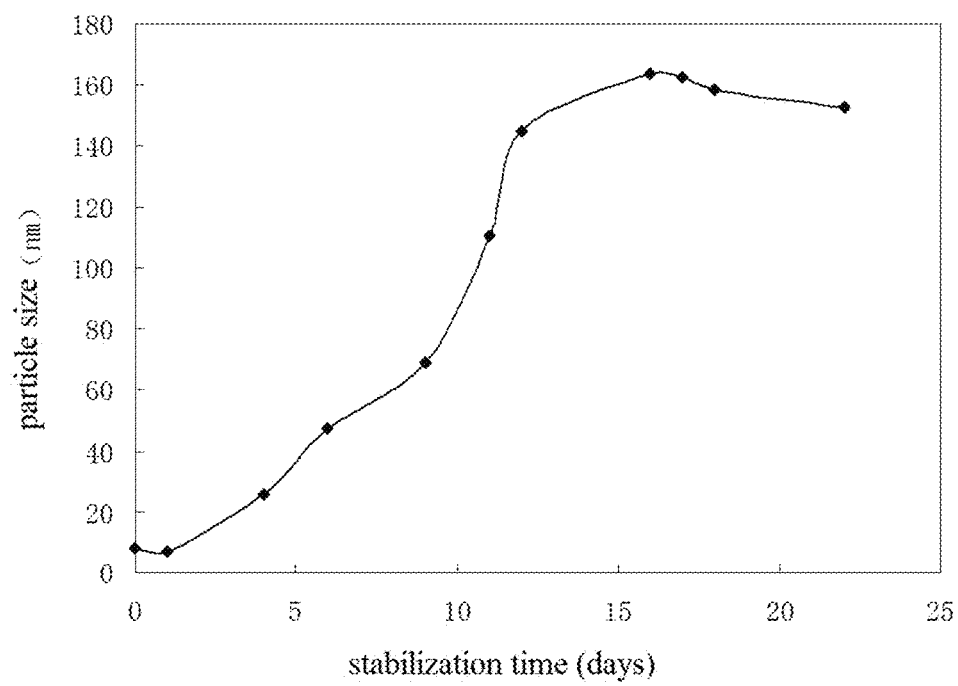
FIG. 5 is a graph showing the average particle size distribution of an anionic nano microemulsion prepared in Example 1 over time.

(3) The initial average particle size of the microemulsion was determined to be 8.0 nm by dynamic light scattering (BI-200SM, Brookhaven) at 90°. After stabilization for 22 days, the average particle size was 152.8 nm (see FIG. 5).

EXAMPLE 2

This example provides a core-shell structured anionic nano microemulsion system and a preparation method thereof. The main preparation steps and test results are as follows:

(1) In parts by weight, 10 parts of pyrrolidone, 50 parts of anionic Gemini surfactant of N,N,N',N'-dodecyl tetrasubstituted diphenyl ether sulfonate, 20 parts of isopropanol, and 20 parts of water are weighed and put into reactor, and mixed under agitation at 300 rpm, until completely dissolved, and a homogeneous mixed solution is obtained.

(2) In parts by weight, 0.2 parts of the above homogeneous mixed solution and 99.8 parts of water were taken, and mixed under agitation at 300 rpm in a reactor, until completely dissolved, to obtain a core-shell structured anionic nano microemulsion system. The effective concentration thereof is 0.16%, the appearance is uniform and transparent, and it is stable for a long time.

Figure 6:
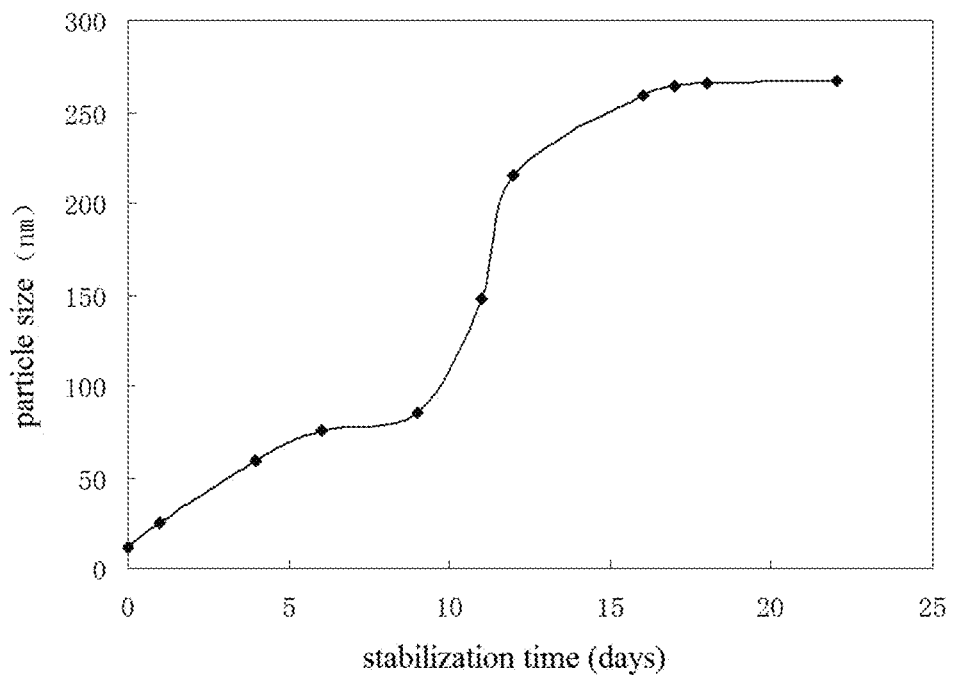
FIG. 6 is a graph showing the average particle size distribution of an anionic nano microemulsion prepared in Example 2 over time.

(3) The initial average particle size of the microemulsion was determined to be 12.1 nm by dynamic light scattering (BI-200SM, Brookhaven) at 90°. After stabilization for 22 days, the average particle size was 267.0 nm (see FIG. 6).

EXAMPLE 3

This example provides a core-shell structured anionic nano microemulsion system and a preparation method thereof. The main preparation steps and test results are as follows:

(1) In parts by weight, 5 parts of thiophene, 45 parts of anionic Gemini surfactant of N,N,N',N'-dodecyl tetrasubstituted diphenyl ether sulfonate, 20 parts of ethanol, and 30 parts of water are weighed and put into reactor, and mixed under agitation at 300 rpm, until completely dissolved, and a homogeneous mixed solution is obtained.

(2) In parts by weight, 0.3 parts of the above homogeneous mixed solution, 98.7 parts of water and 1 part of NaCl were taken, and mixed under agitation at 300 rpm in a reactor, until completely dissolved, to obtain a core-shell structured anionic nano microemulsion system. The effective concentration thereof is 0.21%, the appearance is uniform and transparent, and it is stable for a long time.

Figure 7:
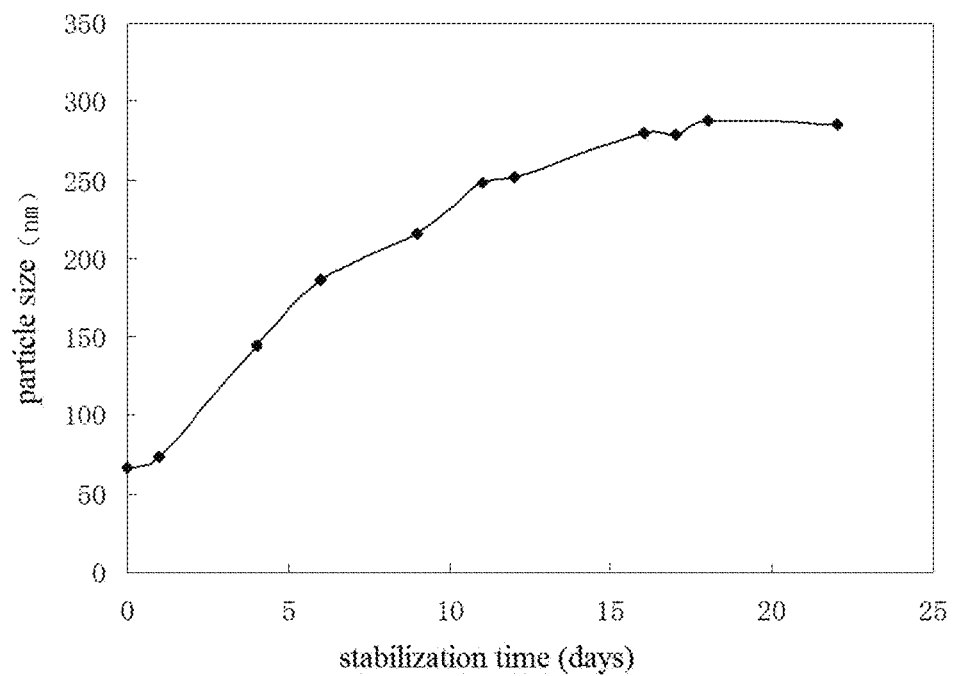
FIG. 7 is a graph showing the average particle size distribution of an anionic nano microemulsion prepared in Example 3 over time.

(3) The initial average particle size of the microemulsion was determined to be 66.5 nm by dynamic light scattering (BI-200SM, Brookhaven) at 90°. After stabilization for 22 days, the average particle size was 285.6 nm (see FIG. 7).

EXAMPLE 4

This Example provides a core-shell structured anionic nano microemulsion system and a preparation method thereof. The main preparation steps and test results are as follows:

(1) In parts by weight, 30 parts of α-pinene, 50 parts of anionic Gemini surfactant of N,N,N',N'-dodecyl tetrasubstituted diphenyl ether sulfonate and 20 parts of pentanol were taken, and mixed under agitation at 300 rpm in a reactor, until completely dissolved, to obtain a homogeneous mixed solution.

Figure 8:
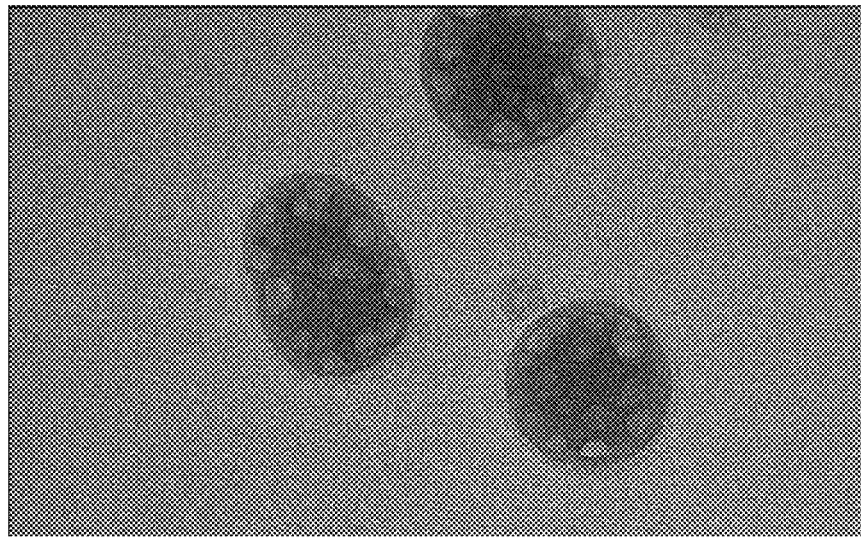
FIG. 8 is a TEM image of an anionic nano microemulsion prepared in Example 4 at a mass concentration of 0.1%.

(2) In parts by weight, 0.1 part of the above homogeneous mixed solution, 94.9 parts of water, 5 parts of NaCl were taken, and mixed under agitation at 300 rpm in a reactor, until completely dissolved, to obtain a core-shell structured anionic nano microemulsion system. The effective concentration thereof is 0.1%, the appearance is uniform and transparent, and it is stable for a long time. The transmission electron microscopy (HT7700, HITACHI, Japan) proved that the microemulsion system at a mass concentration of 0.1% has a spherical core-shell structure (see FIG. 8).

Figure 9:
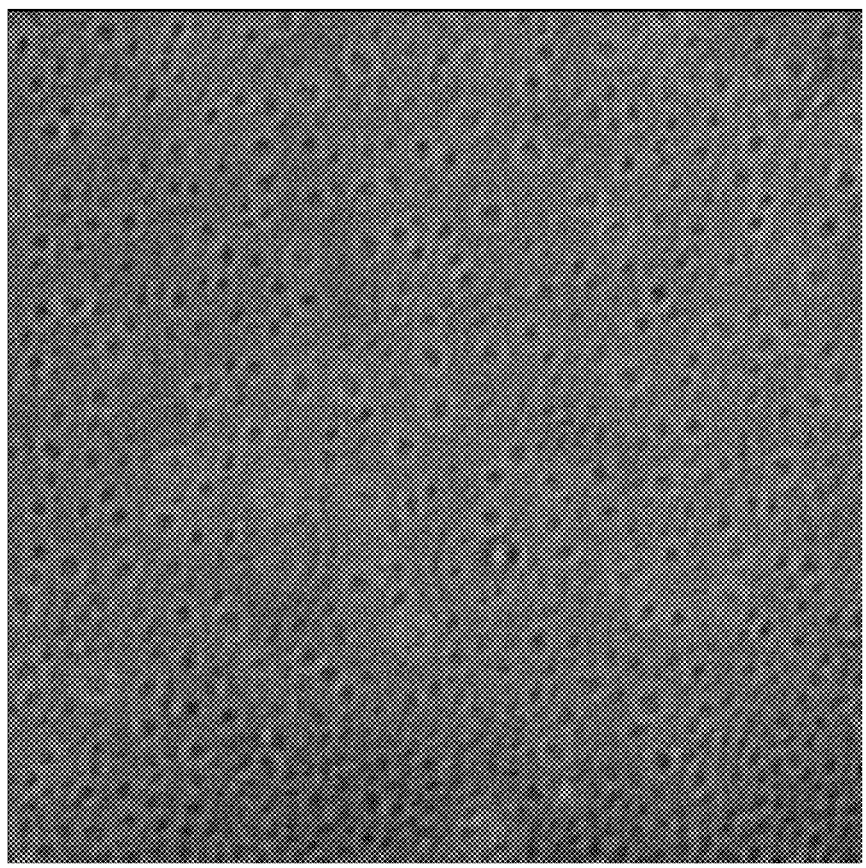
FIG. 9 is a TEM image of an anionic nano microemulsion prepared in Example 4 at a mass concentration of 0.3%.

(3) In parts by weight, 0.3 part of the above homogeneous mixed solution, 94.7 parts of water, 5 parts of NaCl were taken, and mixed under agitation at 300 rpm in a reactor, until completely dissolved, to obtain a core-shell structured anionic nano microemulsion system. The effective concentration thereof is 0.3%, the appearance is uniform and transparent, and it is stable for a long time. The transmission electron microscopy (HT7700, HITACHI, Japan) proved that the microemulsion system at a mass concentration of 0.3% has a spherical core-shell structure (see FIG. 9).

Figure 10:
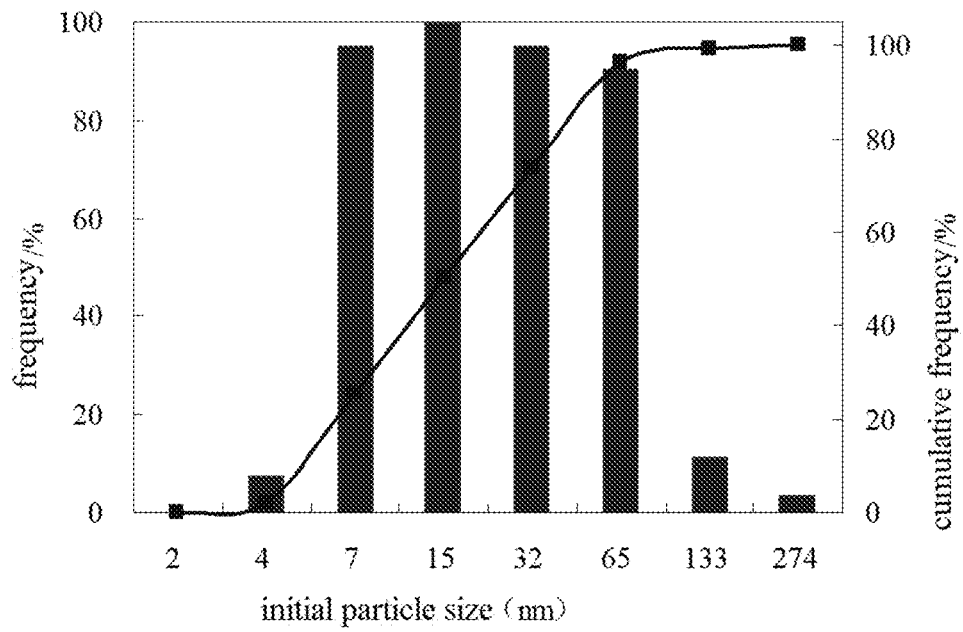
FIG. 10 is a graph showing the initial particle size and its distribution of an anionic nano microemulsion prepared in Example 4 at a mass concentration of 0.1%.
Figure 11:
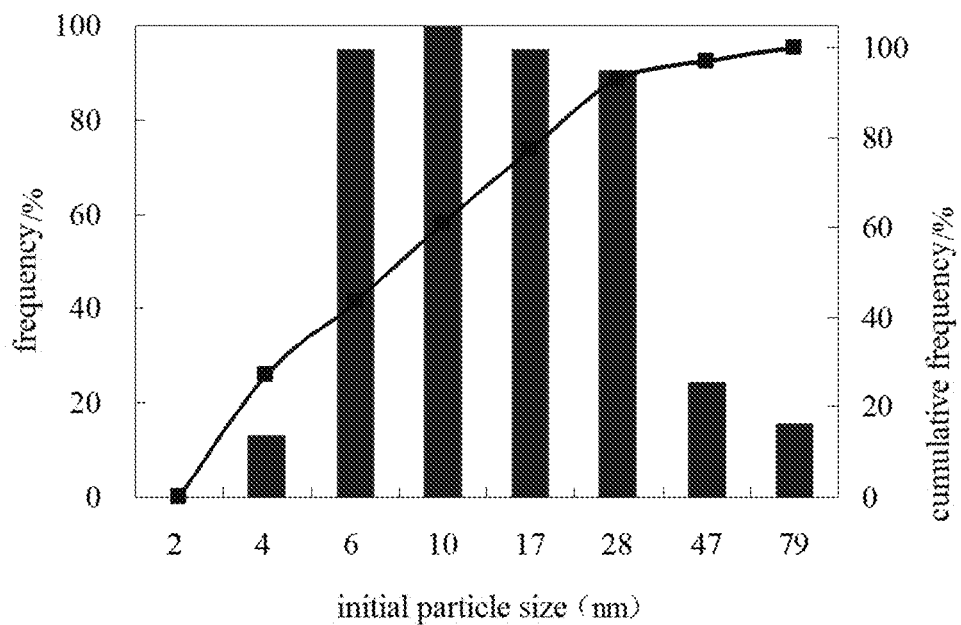
FIG. 11 is a graph showing the initial particle size and its distribution of an anionic nano microemulsion prepared in Example 4 at a mass concentration of 0.3%.
Figure 12:
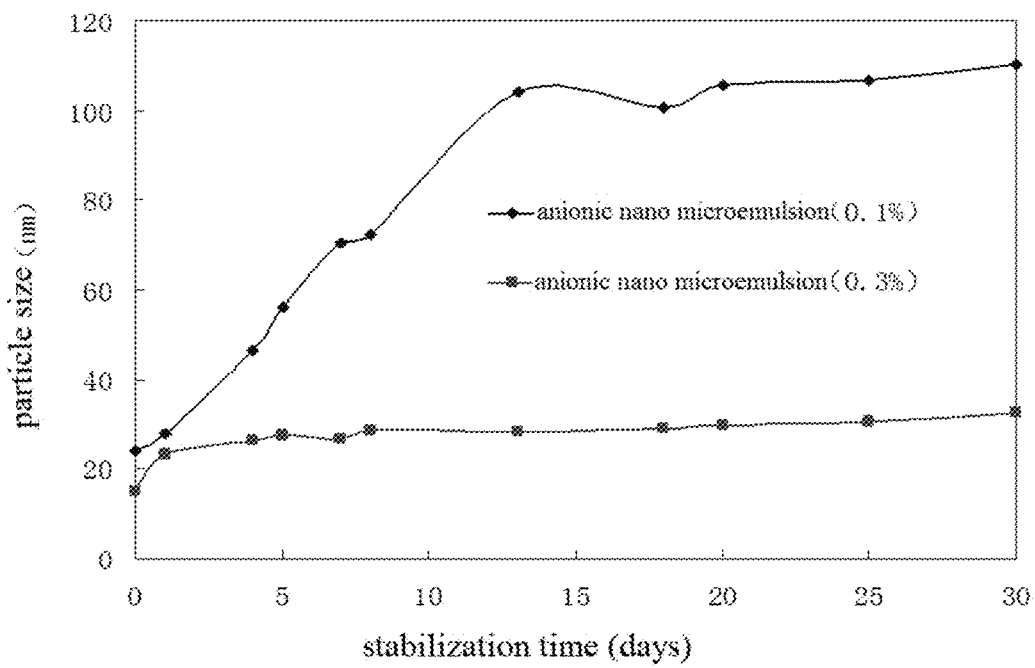
FIG. 12 is a graph showing the average particle size distribution of an anionic nano microemulsion prepared in Example 4 over time.

(4) In dynamic light scattering measurement (Brookhaven BI-200SM) at 90°, the initial average particle diameters of anionic nano microemulsions with mass concentrations of 0.1% and 0.3% were determined as 24.0 nm and 15.1 nm, respectively (see FIGS. 10 and 11), and the particle size distribution was narrow. After stabilization for 30 days, the average particle size was 110.5 nm, and 32.6 nm (see FIG. 12). That is, both the anionic nano microemulsion system have a particle size of less than 40 nm. The particle size of the anionic nano microemulsion at a mass concentration of 0.3% is always smaller than 40 nm, with minimal variation and excellent stability, showing obvious superiority.

EXAMPLE 5

This Example evaluates the main properties of the core-shell structured anionic nano microemulsion system, and the specific results are as follows:

(1) By using a TX500C rotary drop interface force meter, the interfacial tension of 0.1% by mass and 0.3% by mass of anionic nano microemulsion system prepared in Example 4 with kerosene at 80° C. were determined as 0.012 mN/m and 0.009 mN/m, respectively. The experimental results show that the anionic nano microemulsion system has ultra-low interfacial tension, showing obvious superiority.

(2) By using a TX500C rotary drop interface force meter, the interfacial tension of 0.1% by mass and 0.3% by mass of anionic nano microemulsion system prepared in Example 4 with a certain crude oil in Xinjiang (apparent viscosity is 18 mPa·s) at 80° C. were determined as 0.1 mN/m and 0.08 mN/m, respectively. The experimental results show that the anionic nano microemulsion system has ultra-low interfacial tension with crude oil, showing obvious superiority.

Figure 13:
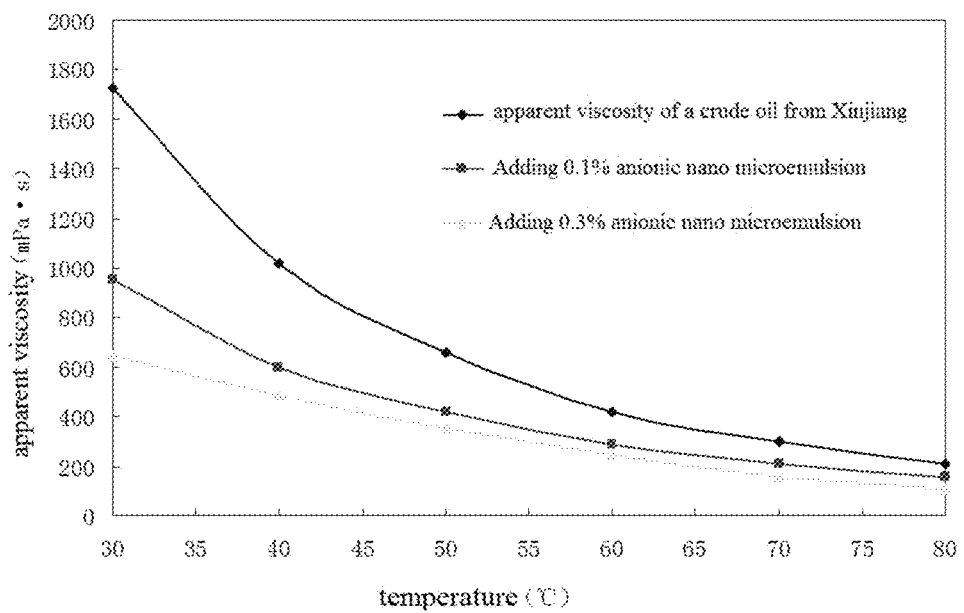
FIG. 13 is a graph showing the effect of an anionic nano microemulsion prepared in Example 4 on the viscosity reduction of a certain crude oil from Xinjiang.

(3) By using a rheometer (RS600, Huck, Germany), the effects of 0.1% by mass and 0.3% by mass of anionic nano microemulsion system prepared in Example 4 on reducing the viscosity of certain crude oil in Xinjiang were determined (see FIG. 13). The experimental results show that the anionic nano microemulsion system has an average viscosity reduction efficiency of 40% for a certain crude oil in Xinjiang, which is a good viscosity-reducing effect and shows obvious superiority.

It will be apparent that the above-described examples of the present invention are merely for clearly illustration of the present invention and are not intended to limit the embodiments of the present invention. To those of ordinary skill in the art, other different forms of changes or variations may also be made on the basis of the above description. It is unable to exhaust all implementations, and the obvious changes or variations that are introduced from the technical solution of the present invention are still within the scope of the present invention.

What is claimed is:

1. A core-shell structured anionic nano microemulsion system, wherein the system comprises: an anionic Gemini surfactant, an oil phase material, a solubilizer and water;
wherein the microemulsion has a core-shell structure, with the outer shell being the anionic Gemini surfactant, and the inner core being the oil phase material; and the anionic Gemini surfactant is N,N,N',N'-dodecyl tetra-substituted diphenyl ether sulfonate having the structural formula:

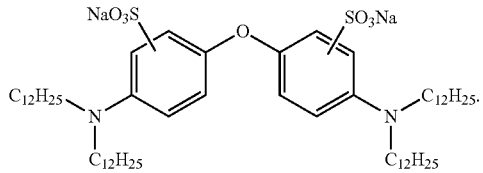

2. The anionic nano microemulsion system according to claim 1, wherein the microemulsion has a droplet size ranging from 5 to 300 nm.

3. The anionic nano microemulsion system according to claim 1, wherein the microemulsion has an effective concentration of of 0.05 to 0.5%, wherein the effective concentration is the total concentration of the anionic Gemini surfactant, the oil phase material and the solubilizer.

4. The anionic nano microemulsion system according to claim 3, wherein the anionic Gemini surfactant accounts for 5 to 77% by mass, the oil phase material accounts for 5 to 46% by mass, and the solubilizer accounts for 5 to 31% by mass.

5. The anionic nano microemulsion system according to claim 1, wherein the oil phase material is selected from an aromatic hydrocarbon compound, a heterocyclic compound, and a terpene compound, or a combination thereof.

6. The anionic nano microemulsion system according to claim 5, wherein the oil phase material is selected from xylene, pyrrolidone, menthol, alpha-pinene, beta-myrcene, limonene, or a combination thereof.

7. The anionic nano microemulsion system according to claim 1, wherein the solubilizer is selected from one or more small molecule alcohol compounds.

8. The anionic nano microemulsion system according to claim 7, wherein the solubilizer is selected from ethanol, propanol, isopropanol, ethylene glycol, butanol, pentanol, or a combination thereof.

9. The anionic nano microemulsion system according to claim 1, wherein the anionic nano microemulsion system further comprises an inorganic salt.

10. The anionic nano microemulsion system according to claim 9, wherein the inorganic salt has a mass content of 0 to 15%, excluding 0.

11. A preparation method for the anionic nano microemulsion system according to claim 1, wherein the method comprises:
S1, mixing an anionic Gemini surfactant, an oil phase material, a solubilizer and water well, to obtain a homogeneous mixed solution; or
mixing an anionic Gemini surfactant, an oil phase material, and a solubilizer well, to obtain a homogeneous mixed solution; and
S2, diluting the homogeneous mixed solution using water or inorganic brine to a low concentration condition, to obtain the core-shell structured anionic nano microemulsion system.

12. The preparation method according to claim 11, wherein the homogeneous mixed solution from S1 comprises by mass: 5 to 50% of the anionic Gemini surfactant, 5 to 30% of the oil phase material, 5 to 20% of the solubilizer, and water to balance.

13. The preparation method according to claim 11, wherein the low concentration condition is that the effective concentration of the microemulsion is 0.05 to 0.5%.

14. The preparation method according to claim 11, wherein the oil phase material is selected from an aromatic hydrocarbon compound, a heterocyclic compound, a terpene compound, or a combination thereof.

15. The preparation method according to claim 11, wherein the oil phase material is selected from xylene, pyrrolidone, menthol, alpha-pinene, beta-myrcene, limonene, or a combination thereof.

16. The preparation method according to claim 11, wherein the solubilizer is selected from ethanol, propanol, isopropanol, ethylene glycol, butanol, pentanol, or a combination thereof.

17. The preparation method according to claim 11, wherein in S2, the inorganic salt brine is used for diluting, and the obtained anionic nano microemulsion system has an inorganic salt mass content of 0 to 15%, excluding 0.

18. The preparation method according to claim 11, wherein the microemulsion in the anionic nano microemulsion system has a droplets size ranged from 5 to 300 nm.

19. The preparation method according to claim 11, wherein the mixing and diluting are carried out under an agitation at 10 to 400 rpm.

* * * * *